United States Patent [19]

Phillips

[11] 4,115,270
[45] Sep. 19, 1978

[54] CHLORINATOR FOR SWIMMING POOLS

[76] Inventor: Ash S. Phillips, 1944 Park Ave., San Jose, Calif. 95126

[21] Appl. No.: 846,764

[22] Filed: Oct. 31, 1977

Related U.S. Application Data

[63] Continuation-in-part of Ser. No. 667,262, Mar. 16, 1976, Pat. No. 4,067,808.

[51] Int. Cl.² .............................................. E04h 3/20
[52] U.S. Cl. ........................................ 210/169; 210/62;
  210/198 R; 137/268; 422/281; 422/282
[58] Field of Search ............ 23/272.8, 272.8 F, 272.7,
  23/272; 210/169, 198 R, 60, 62; 137/205.5, 268

[56] References Cited
U.S. PATENT DOCUMENTS

| | | | |
|---|---|---|---|
| 2,984,250 | 5/1961 | Foster | 23/272.8 F |
| 3,052,525 | 9/1962 | Vogelman | 23/272.8 F |
| 3,129,172 | 4/1963 | Dickey | 23/272.7 |
| 3,166,096 | 1/1965 | Lang | 23/272.8 F |
| 3,383,178 | 5/1968 | Dietz | 23/272.7 |
| 3,574,559 | 4/1971 | Kryzer | 23/272.7 |
| 3,710,817 | 1/1973 | Lorenzen | 23/272 |
| 3,912,627 | 10/1975 | Tepas | 23/272.8 |
| 4,026,673 | 5/1977 | Russo | 23/272.8 |
| 4,067,808 | 1/1978 | Phillips | 210/169 |

Primary Examiner—Stephen J. Emery
Attorney, Agent, or Firm—Leslie M. Hansen

[57] ABSTRACT

A chlorinator for swimming pools in which a quantity of granular dry crystals of chlorine is interposed in a bypassed stream of pool water for creating a chlorine concentrate in a container related to a mixing chamber such as to introduce a measured portion of the chlorine concentrate into the bypassed water prior to its returning to the swimming pool.

5 Claims, 4 Drawing Figures

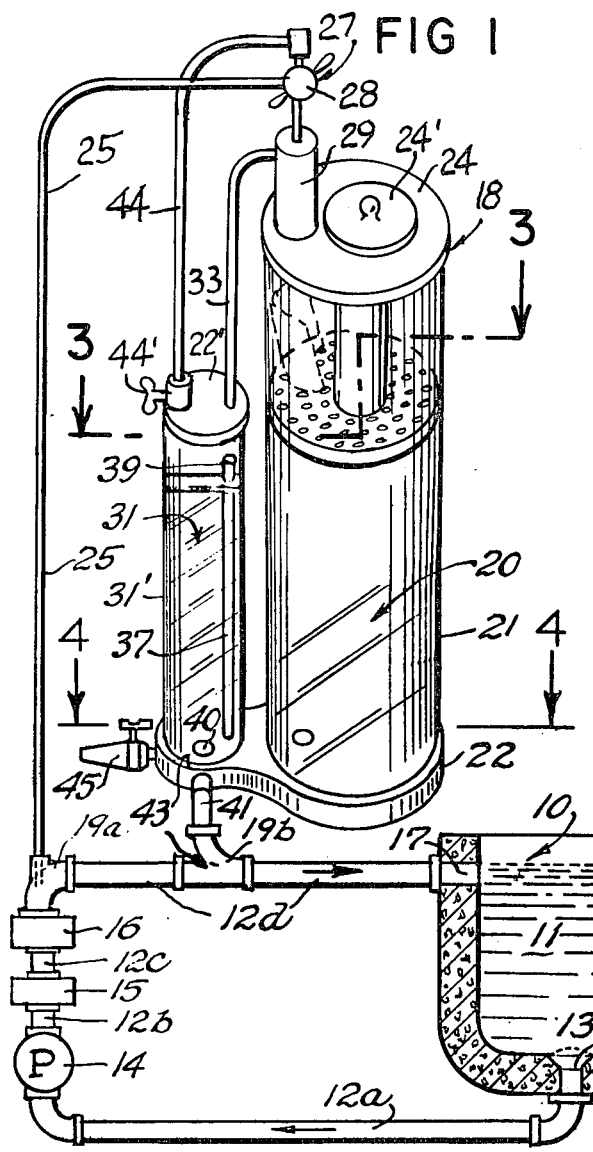
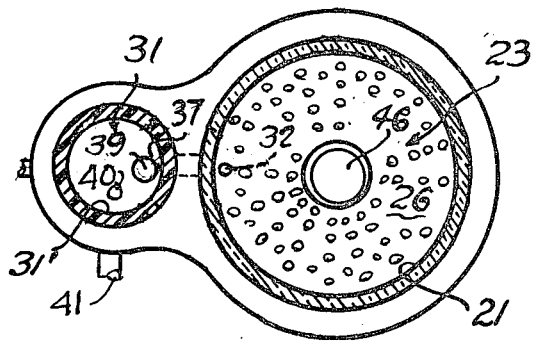
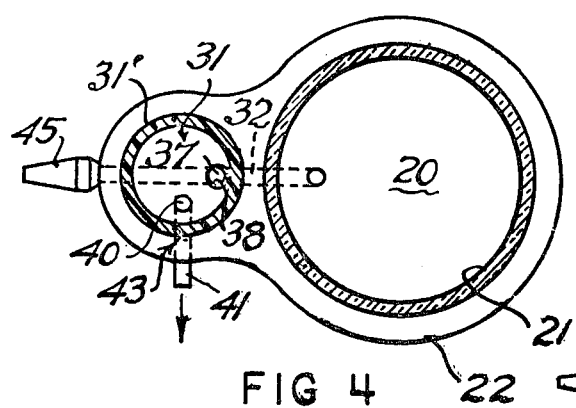
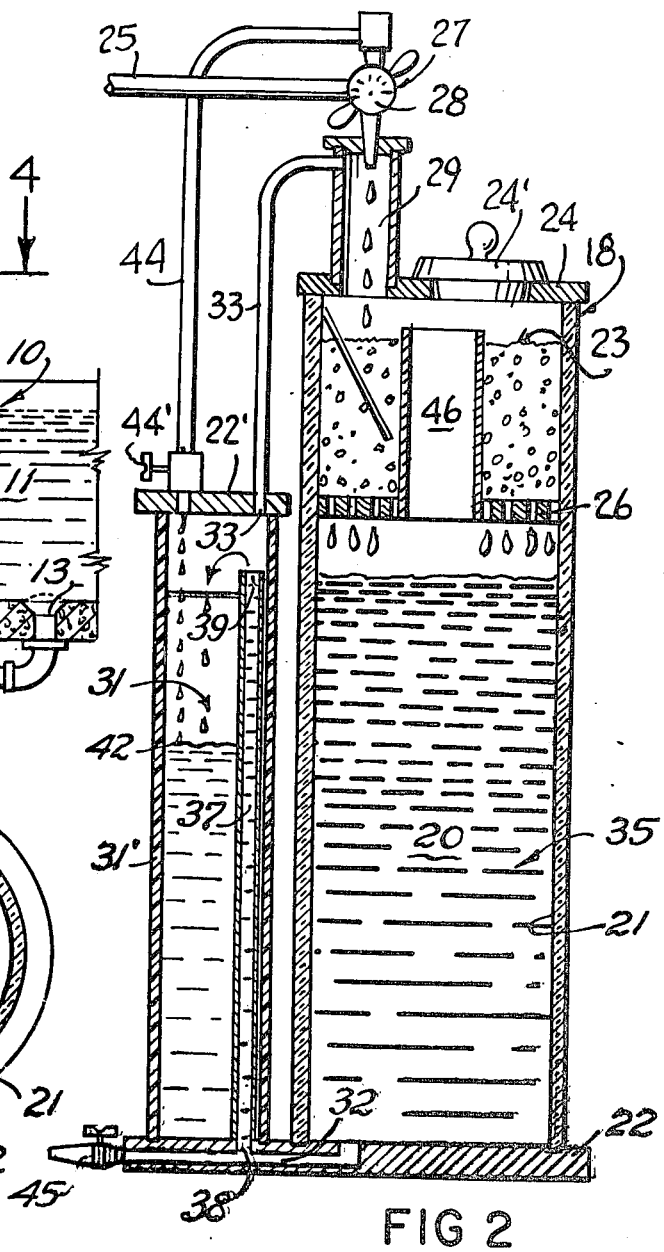
FIG 1
FIG 3
FIG 4
FIG 2

CHLORINATOR FOR SWIMMING POOLS

This application relates to a chlorinator for swimming pools and is a continuation in part of my co-pending application, Ser. No. 667,262, filed on Mar. 16, 1976, now U.S. Pat. No. 4,067,808.

BACKGROUND OF THE INVENTION

My co-pending application discloses an apparatus in which a pre-conditioned supply of chlorine concentrate is deposited into a vertically arranged container having its lower end in communication with that of a chlorine concentrate supply tube which is disposed vertically adjacent and parallel to the vertically arranged container and has an open upper end for overflow into a mixing chamber confining the concentrate supply tube for receiving the overflow liquid concentrate therefrom. The mixing chamber has an outlet at its lower end communicating with the down stream side of the return line of the pool water circulating system. The system has a bypass conduct leading from its upstream side for metered flow into the upper region of the chlorine concentrate container.

A layer of separating material is floatingly supported upon the upper surface of the supply of chlorine concentrate in the container. The incoming bypassed pool water admitted into the upper region of the container builds up to a level therein and rises to the horizontal level of the upper end of the chlorine supply tube. This forces the chlorine concentrate in the container to rise in the supply tube and to overflow into the mixing chamber in quantitative volume equal to the admission of the bypassed fluid into the container above the chlorine concentrate solution.

This present application is a continuation in part of the disclosure in the aforementioned co-pending application. The difference involves elimination of the separating material supported upon the chlorine concentrate and the provision of a steeping chamber in the upper region of the container for supporting a supply of dry crystaline granular chlorine salts or powder and for receiving the bypassed pool water coming from the upstream side of the pool water circulating system.

The steeping chamber of the present application has a perforated bottom whereby bypassed pool water collecting over the dry granular chlorine crystals steep through the latter and drops into the container as chlorine concentrate. Once the chlorine concentrate in the container builds up to the level of the upper end of the concentrate supply tube for overflow (as above stated), the operation of the apparatus is the same as described and claimed in my earlier application, Ser. No. 667,262.

It should here be noted that other patents in the prior art disclosed one form or another of a chlorine releasing chemical material soluble in water such as to create a chlorine concentrate. The U.S. Pat. No. 3,474,817 to Bates et al, dated Oct. 8, 1969, shows cakes of such material in a bypass line. U.S. Pat. No. 3,203,440, which issued to Schneider on Aug. 31, 1965, shows the same; whereas the Schneider U.S. Pat. No. 3,323,539 of June 6, 1967, shows chlorine compound sticks over which bypassed pool water flows to release the desired amount of chlorine directly thereto.

The only patent of which I am aware showing granular material introduced into bypassed pool water is the one that issued on Apr. 17, 1973, to Pansini as U.S. Pat. No. 3,727,632. In the Pansini disclosure, the material is in the form of pellets or shot stored in an overhead hopper and gate fed into a mixing chamber in response to a float valve disposed therein dependent upon the level of bypassed pool water as it collects in such mixing chamber. It is within the mixing chamber of the Pansini disclosure that the chlorine containing pellets dissolve so as to create a chlorine addative (not a concentrate) for direct flow into the downstream side of the return line.

In applicant's disclosure, it is the steeping of the dry chemical within the steeping chamber that releases the chlorine as a chlorine concentrate into the vertically arranged container therefor.

BRIEF DESCRIPTION OF THE DRAWINGS

The following is a brief description of the drawings:

FIG. 1 is a diagrammatic view of a conventional swimming pool and its water recirculation system combined with the chlorinator of this invention;

FIG. 2 is an enlarged vertical sectional view of the chlorinator shown in FIG. 1;

FIG. 3 is a cross sectional plan view toward the top of the container of the chlorinator taken along lines 3—3 of FIG. 2;

FIG. 4 is a cross sectional view similar to that of FIG. 3 taken along line 4—4 thereof to show the bottom plan thereof.

DETAILED DESCRIPTION OF THE INVENTION

Referring now more specifically to FIG. 2, the chlorinator 18 of this invention is seen to include a large container 20 of sufficient volume to support a supply of chlorine concentrate solution. The container 20 is preferably in the form of a cylinder 21 which may be a glass or a plastic tube. The lower end of cylinder 21 is sealed to a bottom 22. The top of the container has a steeping chamber 23 mounted thereon which is covered as at 24 and provided with an access opening provided with a removable cover 24'. A pool water supply conduit 25 has one end thereof sealed to and inserted through the coupler 19a of the return conduit 12d. Coupler 19a connects pool water supply conduit 25 to an upstream zone of the return conduit 12d in close proximity to the pump 14, to allow the open end of the conduit 25 to receive some of the circulating pool water therefrom. The supply conduit 25 extends upwardly and has its other end disposed above the cylinder 20 to discharge the received pool water into the steeping chamber 23 of the chlorinator 18. The coupler 19b is located further downstream from pump 14 where the water pressure is substantially lower. The pool water supply conduit 25 is tapped into the return conduit 12d at an upstream zone to provide a sufficient water pressure to enable the water received by pool water supply conduit 25 to rise to a height above the top of the container 20. A regulating valve 27 is inserted in pool water supply conduit 25 to adjust and limit the flow of water into the chamber 23.

The steeping chamber 23 has a perforated bottom 26 and is preferably provided with a tubular vent stack 46 mounted concentrically upon the bottom 26 for providing a vent shaft between the upper end of the container 20 and the upper end of the steeping chamber.

The chamber 23 is built to hold a generous supply of dry powdered or crystaline chemical compound of chlorine spread evenly above a perforated bottom 26 of the chamber 23. The bypassed pool water admitted via the regulating valve 27 spreads over the crystaline particles and steeps through the same to release chlorine concentrate as it drips through the perforated bottom 26.

At the outset, the valve 27 is opened to full flow to pour enough bypassed pool water over the dry chemical material to generate a supply of chlorine concentrate within the container 20 therefor.

Thereafter, the regulating valve 27 is adjusted to vary the rate of flow to a much slower volume, for example, drop by drop at a rate of about two drops per second.

In the present disclosure, the regulating valve 27 is preferably a metering valve with a dial 28 having indecia to enable adjusting the valve 27 to a desired setting dependent upon the chlorination needed in the swimming pool water. The metered flow of bypassed pool water from the valve 27 enters the chlorinator 18 via a vestibule 29 mounted on the top 24′ of the steeping chamber 23. The bypassed pool water entering the vestibule 29 normally exits therefrom by its open bottom formed through the top member 24′ in the region of the upper end of the chamber 23 surrounding the vent stack 46.

Adjacent the cylindrical wall 21 of container 20, a vertical mixing chamber 31 in the form of a smaller diametered tube 31′ is sealed at its ends between a top 22′ and a bottom 22 as members of the chlorinator. The two cylindrical tubes 21 and 31′ stand parallel to each other such that the chambers 20 and 31 have communication at their lower ends via a passage 32 formed between them in the bottom member 22.

The upper end of the mixing chamber 31 communicates with the vestibule 29 via a tube 33 formed through the top member 22′. By this arrangement the upper regions of both the chamber 31 and the container 20 are in communication with each other to equalize the pressure above the fluids therein.

A chlorine concentrate supply tube 37 is provided with one end 38 thereof connected to the bottom member 22 within the mixing chamber 31 and in communication with the passage 32 formed in member 22 to receive chlorine concentrate solution 35. The other end 39 of tube 37 extends upwards within the mixing chamber 31 to a height above the level of the chlorine concentrate solution 35 in container 20 to direct its output into the upper region of the mixing chamber 31. Since the upper regions of the chamber 31 and container 20 are in pressure equalizing communication via the vestibule 29 and overflow tube 34 the downward pressure of the chlorine concentrate 35 within the container 20 is forced through the passage 32 in the bottom member 22 and up into the chlorine concentrate supply tube 37.

In addition to the chlorine concentrate spilling into the mixing chamber 31, a predetermined amount of pool water is admixed therewith by reason of a metered flow from the valve 27-28 passing through a conduit 44 in sufficient quantity and under control of a valve 44′ at the top cover 22′ of the mixing chamber.

It will be noted in FIGS. 1 and 4 that the lower end of the mixing chamber 31 has an outlet port 40 formed through the bottom member 22. This outlet port 40 has communications with one open end of a conduit 41, the opposite end of which is connected to the coupler 19b in the return line 12d.

The discharge end of auxiliary conduit 41 is located in return conduit 12d at a distance downstream from pump 14 at a position of reduced water pressure so that the level of pool water only rises to a height 42 in mixing chamber 31 which is lower than the top end 39 of the supply tube 37 therein.

Coupler 19b is similar to coupler 19a previously described. Mixing chamber 31 and auxiliary conduit 41 comprise a feeder member 43 herein connected to return conduit 12d to limit and hold any pool water rising within the chamber 31 to a level lower than that of the overflow end 39 of the tube 37 when the pool water flows through the return conduit under pressure.

In operating the chlorinator of this invention, cylinder 20 is initially filled with chlorine concentrate solution 35 to a height just below that of the overflow outlet 39 of tube 37. Some of the chlorine concentrate solution 35 will enter the tube 37 via passage 32 and rise to the same height as the concentrate in container 20, but will not overflow out of end 39 into chamber 31. When pump 14 is operating, some of the pool water flows through conduit 12a from drain 13 through conduit 12b, filter 15, conduit 12c, heater 16, and through return conduit 12d back into swimming pool 10 via outlet 17. As the pool water is circulated in the recirculation system, the water pressure in return conduit 12d causes some pool water to bypass via supply conduit 25 for discharge at its upper end into the vestibule 29. Regulating valve 27 is adjusted for the desired flow rate which is preferably low, i.e. at a measured rate. As the pool water enters vestibule 29, it will escape, drop by drop, into the steeping chamber, forming and gradually increasing the volume of chlorine concentrate in the container 20. The weight of the added water in chamber 20 will force the column of chlorine concentrate solution 35 downwards forcing some of the chlorine concentrate solution 35 through passage 32 and up into overflow tube 37. The weight of the added water will ultimately cause the chlorine concentrate solution to overflow at 39 into the mixing chamber 31. The rate of discharge of the chlorine concentrate solution into the mixing chamber 31 will thereafter depend upon the rate of pool water input into the steeping chamber 23 and container 20. For example, if one drop of chlorine concentrate is as heavy as two drops of water, then one drop of chlorine concentrate solution will be discharged into chamber 31 for every two drops of pool water entering container 20.

Within the chamber 31 of the feeder member, the pool water is limited from rising to a height higher than the top end 39 of the tube 37 dependent upon the pressure in return conduit 12d. It will be realized that as the chlorine concentrate solution is thus gradually introduced via supply tube 37, its added weight will cause a corresponding outflow of concentrated fluid admixture through outlet port 40 and conduit 41 into return line 12d. Thence, the rechlorinated mixture flows into swimming pool 10 via outlet 17, to be mixed with the swimming pool water 11. During the operation of pump 14, this process continues until the amount of chlorine concentrate solution 35 in container 20 is exhausted. Thereafter, all that needs to be done is to drain container 20 by opening a drain valve 45, reclose valve 45, and refill container 20 with some more chlorine concentrate solution 35. Thereafter, the chlorinator will continue to operate as above described.

While I have described the herein chlorinator in specific detail, it will be appreciated by those skilled in the art that the structure, shapes and proportions thereof may be susceptible to variations, alterations and/or modifications without departing from the spirit or scope of the invention therein, as set forth in the appended claims.

I claim:

1. A chlorinator for a swimming pool having a pool water recirculating system in which a drain line at the base of the pool is connected to a pump and a return line leading back into the pool, a bypass sytem comprising:
    (1) a vertically arranged container located above the return line adapted to hold a supply of chlorine concentrate solution;
    (2) a steeping chamber arranged in the upper end of said vertically arranged container;
    (3) said steeping chamber having a perforated bottom;
    (4) a supply of dry chlorine containing material located in said steeping chamber on said perforated bottom;
    (5) a pool water supply conduit having one end connected to an upstream zone of the return line and its opposite end disposed above said steeping chamber;
    (6) a regulating valve in said pool water supply conduit for metering the flow of pool water therefrom and for discharging the pool water in a measured rate into the upper region of said steeping chamber to dissolve said chlorine containing material; the lower portion of said vertically arranged container collecting a supply of aqueous chlorine concentrate therein;
    (7) a chlorine concentrate supply tube arranged vertically adjacent said container with its upper end disposed just below the level of said perforated bottom and having its lower end communicating with the lower end of said container for receiving chlorine concentrate solution therefrom;
    (8) a mixing chamber arranged vertically adjacent said container in a position to receive chlorine concentrate solution from the open upper end of said chlorine concentrate supply tube as it overflows therefrom due to the added weight of pool water at rest upon the supply of aqueous chlorine concentrate in said vertically arranged chamber, said mixing chamber being a tubular member parallel to and circumscribing said chlorine concentrate supply tube and having its lower end closed except for its communication with the downstream zone of the return line;
    (9) said steeping chamber and said mixing chamber having their upper ends closed;
    (10) conduit means for communicating theupper ends of said steeping chamber with the upper end of said tubular member of the mixing chamber for equalizing the pressure therein to allow the chlorine concentrate solution transferred from the container to rise within said chlorine concentrate supply tube dependent upon the measured rate of discharge of pool water into the upper region of said steeping chamber and container;
    (11) a feeder member for communicating the lower end of said mixing chamber with a downstream zone of the return line for discharging a metered quantity of chlorine concentrate solution into the return line and the pool water therein as it returns to the swimming pool and,
    (12) a pool water supply conduit having one end connected to the upper end of said mixing chamber for discharging water at a measured rate into said mixing chamber.

2. The chlorinator in accordance with that of claim 1 in which said vertically arranged container and tubular member of the mixing chamber have their lower ends sealingly secured to a common bottom, and including a passage formed in said common bottom to provide the communication between the lower ends of said mixing chamber and said container.

3. The chlorinator in accordance with that of claim 1 including a drain plug in said common bottom communicating with said passage therein.

4. The chlorinator in accordance with that of claim 1 including a vestibule mounted upon the upper end of said steeping chamber for dispensing pool water into the latter, and
    (1) means for connecting the upper end of said vestibule to said regulating valve for receiving bypassed pool water therefrom.

5. The chlorinator in accordance with that of claim 1 including a vent stack within said steeping chamber having its lower end communicating with the upper end of said container through the perforated bottom of said steeping chamber and its upper end disposed above the supply of dry chlorine containing material supported therein; and a tube extending between the upper end of said tubular member of the mixing chamber and the upper end of said vestibule above the steeping chamber.

* * * * *